United States Patent
Doessel et al.

(10) Patent No.: US 6,441,078 B1
(45) Date of Patent: Aug. 27, 2002

(54) AQUEOUS POWDER COAT DISPERSIONS, PROCESS FOR THEIR PREPARATION AND THEIR USE

(75) Inventors: Karl-Friedrich Doessel, Wuppertal; Oliver Reis, Witten; Volker Rekowski, Bochum, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/520,813

(22) Filed: Mar. 8, 2000

(51) Int. Cl.$^7$ ................................ C08K 3/34
(52) U.S. Cl. ........................................ 524/442
(58) Field of Search ........................... 524/442

(56) References Cited

U.S. PATENT DOCUMENTS

| | | | | |
|---|---|---|---|---|
| 3,869,409 A | * | 3/1975 | Bebris | 252/446 |
| 4,478,271 A | | 10/1984 | Kano et al. | |
| 4,481,328 A | * | 11/1984 | Harreus | 524/493 |
| 4,904,531 A | * | 2/1990 | Kelly | 428/404 |
| 5,063,179 A | * | 11/1991 | Menashi | 501/12 |
| 5,418,043 A | * | 5/1995 | Ogawa | 428/195 |
| 5,484,581 A | * | 1/1996 | Esch | 423/335 |
| 5,747,391 A | * | 5/1998 | Neubach | 442/70 |
| 5,951,962 A | * | 9/1999 | Muller | 204/489 |
| 5,965,213 A | | 10/1999 | Sacharski et al. | 427/475 |
| 5,981,653 A | | 11/1999 | Wilmes et al. | 524/839 |
| 6,093,298 A | * | 7/2000 | Kaylo | 423/702 |
| 6,107,387 A | * | 8/2000 | Kaylo | 524/446 |

FOREIGN PATENT DOCUMENTS

| | | |
|---|---|---|
| EP | 0 652 264 A2 | 10/1994 |
| EP | 0 832 947 A2 | 1/1998 |
| EP | 899282 | 3/1999 |
| WO | WO9637561 | 11/1996 |
| WO | WO9827141 | 6/1998 |

OTHER PUBLICATIONS

Dr. Ulrich Zorll, Rompp Lexikon Lacke und Druckfarben, Thieme Verlag, New York, Stuttgart, 323 and 324, 1998.

* cited by examiner

*Primary Examiner*—Paul R. Michl
(74) *Attorney, Agent, or Firm*—Sudhir G. Deshmukh

(57) ABSTRACT

Improved aqueous powder coat dispersion, comprising (a) a powder coating dispersed in (b) an aqueous phase, wherein the aqueous phase contains a silica compound selected from the group consisting of (i) 0.2 to 2% by weight, based on the weight of the powder coating, of finely divided silicic acid with large BET-surface; (ii) 0.1 to 1.5% by weight, based on the weight of the powder coating, of layered silicates; and (iii) combinations thereof, exhibit improved sedimentation properties and provide coatings with improved sag characteristics.

10 Claims, No Drawings

AQUEOUS POWDER COAT DISPERSIONS, PROCESS FOR THEIR PREPARATION AND THEIR USE

BACKGROUND OF THE INVENTION

The present invention relates to aqueous powder coat dispersions, a process for their preparation and their use.

In more recent times aqueous powder coat dispersions and processes for their preparation have been the subject of a number of patent applications. By aqueous powder coat dispersions are meant powder coatings dispersed in an aqueous phase. Apart from water, the aqueous phase contains in general additives which, for example, have been used in the preparation of the aqueous powder coat dispersions and/or which are meant to give to the aqueous powder coat dispersions properties which are advantageous for their technical application.

Aqueous powder coat dispersions, for example, containing non-ionic polymer thickeners, in particular non-ionic polyurethane associative thickeners, are known from WO 96/32452 and WO 96/37561. The sedimentation stability of these aqueous powder coat dispersions requires improvement, they require a permanent thorough mixing in order to avoid sedimentation phenomena. A more advantageous sagging behavior of the coating layers prepared from the aqueous powder coat dispersions is desirable from a technical application point of view.

SUMMARY OF THE INVENTION

Accordingly, it is an object of the present invention to provide aqueous powder coat dispersions having higher sedimentation stability and reduced sagging tendency.

The object can be achieved by providing aqueous powder coat dispersions, the aqueous phase of which contains a silica compound selected from the group consisting of (1) finely divided silicic acid. with large Brunauer-Emmett-Tellersurface ("BET-surface") and (2) layered silicates.

It is therefore an object of the invention to provide an aqueous powder coat dispersion comprising (a) a powder coating dispersed in (b) an aqueous phase, wherein the aqueous phase contains a silicate compound selected from the group consisting of (1) 0.2 to 2% by weight, based on the weight of the powder coating, of finely divided silicic acid with a large BET-surface, (2) 0.1–1.5% by weight, based on the weight of the powder coating, of layered silicates and (3) combinations thereof.

DETAILED DESCRIPTION OF THE EMBODIMENTS

The aqueous powder coat dispersions according to the invention are aqueous coating agents which comprise a solid content of, for example, 20 to 60% by weight in the state in which they are ready for application. The solid content in the dispersion is comprised of the solid non-volatile powder coating and the silica compound, and optionally additional non-volatile components contained in the aqueous phase (e.g., pigments). The expression "non-volatile" includes for example volatile components which might appear under the particular conditions used for applying and curing the aqueous powder coat dispersions according to the invention. Examples of such volatile components are evaporation losses or cleavage products produced during application, flash-off, flow and optionally curing of the coating layers applied from the aqueous powder coat dispersions according to the invention. The cleavage products can for example form during cross-linking reactions taking place under condensation.

A preferred embodiment of the aqueous powder coat dispersions according to the invention is represented by aqueous powder clear coat dispersions with a solid content, for example, of 20 to 45% by weight, preferably of 25 to 40% by weight, and which are suited for the preparation of transparent (i.e., clear) coating layers.

The powder coating component of the dispersion consists of fine powder coating particles of an average particle diameter ($d_{50}$) of, for example, 0.1 to 10 µm, preferably below 5 µm. Any of the conventional powder coatings known in the art can be used in the powder coating dispersions of this invention. Such powder coatings comprise binders, or binder/cross-linking agent combinations. Optionally, pigments, fillers and additives which are conventionally used in connection with powder coatings may be added to the powder coatings.

Examples of binders that may be used include thermoplastics. It is preferred that the powder coatings which are dispersed in the aqueous powder coat dispersions according to the invention are duroplastic powder coatings based on self cross-linking binders or, particularly preferred, based on external cross-linking binder/cross-linking agent combinations.

In the case of binders/cross-linking agent combinations, binding agents are understood to mean film-forming, higher molecular weight components of a duroplastic powder coating which, for example, represents at least 50% by weight of the basic binder/curing agent combination, whereas the curing agent component, for example, represents at the most 50% by weight of this combination. No limitations are in principle imposed on the binding base of the binder. Binders which are conventionally used for powder coatings, for example, are suitable. Examples are: polyester resins, (meth)acrylic copolymers, epoxy resins, phenolic resins, polyurethane resins and siloxane resins. In the preferred embodiment of aqueous powder clear coat dispersions, polyester resins, polyurethane resins and, in particular, (meth)acrylic copolymers are preferred. The binders, for example, have a glass transition temperature in the range of 30 to 120° C., preferably below 90° C., and, for example, have average molecular weights (Mn) in the range of 500 to 20000, preferably below 10000. The curing agents, for example, have average molecular weights (Mn) from 84 to 3000, preferably below 2000. Various binders and curing agents can be mixed together.

Binders and curing agents carry functional, mutually complementary groups which allow a chemical cross-linking, for example, through addition and/or condensation and/or radical polymerization. Examples of functional groups are carboxyl groups, epoxy groups, aliphatic or aromatic bonded OH groups, isocyanate groups, blocked isocyanate groups, anhydride groups, primary and secondary amino groups, blocked amino groups, N-heterocyclic groups capable of cycle-opening additions, such as, for example, oxazolin groups, olefinically unsaturated groups, such as, for example, (meth)acryloyl groups and CH-acidic groups, such as, for example, acetoacetate groups.

The selection of the mutually reacting groups is well known to the person skilled in the art. Different reactive groups can optionally be combined. This can be done by using binders which carry different reactive functional groups, or mixtures of various curing agents and/or binders are used.

The different functional groups can be present at the same time on the binder and/or curing agent. The binders as well as the curing agents on average contain at least two functional groups per molecule. The ratio of binder to curing agent in general lies in the range of, for example, 98:2 to 50:50. The preferred ratio lies in the range of 95:5 to 70:30. The mixture can also comprise several binders or several curing agents.

As previously mentioned, in a preferred embodiment the aqueous powder coat dispersions according to the invention are aqueous powder clear coat dispersions. The powder clear coat particles dispersed therein contain, for example, binder/cross-linker combinations known from powder clear coats. These are, for example, combinations of hydroxy-functional binders, in particular hydroxy-functional (meth)acrylic copolymers, with blocked polyisocyanate curing agents or, in particular, combinations of epoxy-functional binders, in particular epoxy-functional (meth)acrylic copolymers, with carboxylic- and/or carboxylic acid anhydride-functional curing agents and/or tris(alcoxycarbonylamino)triazine curing agents.

Preferred examples of combinations of epoxy-functional (meth)acrylic copolymers with acidic, particularly carboxylic- and/or carboxylic acid anhydride-functional curing agents are those which contain glycidyl(meth)acrylate copolymers with an epoxy-weight equivalent of between 250 and 1000 as binders and one or more low molecular or polymer compounds having on average two or more carboxyl functions per molecule and/or anhydrides thereof as curing agents, whereby the epoxy groups of the glycidyl (meth)acrylate copolymers are present in a ratio in the range of 1.5:1 to 1:1.5 with respect to the free and/or latent carboxyl functions of the curing agents bonded as anhydrides. The glycidyl(meth)acrylate copolymers have an epoxy-weight equivalent in the range of 250 to 1000, preferably in the range of 300 to 600, particularly preferred in the range of 300 and 450. The glycidyl(meth)acrylate copolymers have, for example, glass transition temperatures in the range of 30 to 120° C., preferably in the range of 30 to 90° C., their average molecular weights (Mn), for example, are in the range of 1000 to 10000, preferably 1000 to 5000.

Apart from glycidyl acrylate and/or glycidyl methacrylate corresponding to an epoxy-weight equivalent in the range of 250 to 1000, the glycidyl(meth)acrylate copolymers contain one or more co-monomers, specifically olefinically unsaturated monomers without any additional functional groups. The precise monomers selected is within the skill of the ordinary artisan and will depend on the desired properties of the copolymer. Examples of such co-monomers are monovinylaromatic compounds such as styrene; vinyl esters of aliphatic carboxylic acids, such as, for example, vinyl acetate, vinyl versatate; vinyl ethers; (meth)acrylonitrile; (meth)acrylamide; but in particular (cyclo)alkyl(meth) acrylates with 1 to 18 carbon atoms in the (cyclo)alkyl part.

The glycidyl(meth)acrylate copolymers, can be produced in a manner-known to the person skilled in the art by way of radical co-polymerization, particularly by way of solution or bulk polymerization.

The curing agents are one or more low molecular or polymer compounds having in average two or more, preferably two carboxyl functions per molecule and/or anhydrides thereof. The anhydride groups are latently bonded carboxyl groups, whereby each anhydride group is counted as a carboxyl group. Examples of carboxy-functional curing agents are solid aliphatic dicarboxylic acids and—to the extent that they exist—their intramolecular anhydrides, particularly preferred being 1,12-dodecandicarboxylic acid. Solid dicarboxylic acid polyanhydrides having average molecular weights (Mw) in the range, for example, of 1000 to 5000 can be used, for example 1,12-dodecandicarboxylic acid(poly)anhydride. Further examples for carboxy-functional curing agents are carboxy-functional copolymers, such as, for example, polyesters, polyurethanes, (meth) acrylic copolymers, carboxy-functional oligourethanes, carboxy-functional oligoesters.

The powder coatings in the aqueous powder coat dispersions according to the invention can contain pigments and/or fillers, for example corresponding to a pigment plus filler/binder plus cross-linking agent ratio of 0:1 to 2.5:1. Examples of pigments and fillers are conventional inorganic or organic color pigments, for example, carbon black, titanium dioxide, azo-pigments, phthalocyanine pigments, effect-giving pigments, for example aluminium pigments, interference pigments, as well as fillers such as barium sulfate, kaolin, talcum, silicon dioxide.

The powder clear coatings contained in the preferred aqueous powder clear coat dispersions contain no pigments and no covering pigments, but they can contain colorless transparent pigments, for example micronized titanium dioxide or silicon dioxide.

The powder coatings can contain conventional powder coat additives in the usual amounts, for example in the range of 0.1 to 5% by weight based on the total amount of powder coating. Examples of such additives are leveling agents, degassing agents, antioxidant agents, light protecting agents, bonding agents, slip additives, catalysts and agents which influence, as such, the melt rheology of the powder coatings.

The aqueous phase of the aqueous powder coat dispersions according to the invention, apart from water, contains a silica compound selected from the group consisting of finely divided silicic acid with large BET-surface, layered silicates and combinations thereof. The expression "finely divided silicic acid" means highly dispersed silica. The finely divided silicic acid with large BET-surface is silicic acid known to the person skilled in the art which has been prepared synthetically, for example pyrogenically or silicic acid prepared by deposition (see Ulrich Zorll, Römpp Lexikon, Lacke und Druckfarben, Thieme Verlag, New York, Stuttgart, 1998). Such finely divided silicic acids with large BET-surface are offered by various manufacturers in a variety of types with different BET-surfaces. The BET-surfaces of the finely divided silicic acids used in the aqueous powder coat dispersions according to the invention lie in the range of, for example, 100 to 400, preferably 200 to 400 square meters/g. Pyrogenic silicic acid is particularly preferred, in particular pyrogenic silicic acid which has not been rendered hydrophobic. The finely divided silicic acid is used in amounts of 0.2 to 2% by weight, preferably 0.5 to 1.5% by weight, based on the weight of the powder coating content in the aqueous powder coat dispersion.

For the preparation of the aqueous powder coat dispersions according to the invention the finely divided silicic acid with large BET-surface contained in the aqueous phase can be inserted or added as powder or as an aqueous preparation, for example, as an aqueous slurry or paste of 1 to 5% by weight.

In an alternate embodiment, the aqueous phase of the aqueous powder coat dispersions, apart from water, contains 0.1 to 1.5% by weight, preferably 0.2 to 1.0% by weight, based on the weight of the powder coat, of layered silicate. The layered silicates are conventional layered silicates known to the person skilled in the art, for example, aluminium-magnesium, sodium-magnesium and sodium-magnesium-lithium silicates with a layered structure.

Examples of such layered silicates are layered silicates of the bentonite, smectite, montmorrilonite and hectorite type. While layered silicates of natural origin can be used, it is preferred, however, to use synthetically prepared layered silicates in the aqueous powder coat dispersions according to the invention. It can be of advantage to use layered silicates of the washed type since these can import less ions into the aqueous powder coat dispersions. Optige®-products from the company Sudchemie, Laponite® RD of Laporte Inc., or Borchigel® layered silicates from the company Borchers are examples of layered silicates that are commercially available and can be used in the aqueous powder coat dispersions according to the invention. The layered silicates contained in the aqueous phase can be used or added for the preparation of the aqueous powder coat dispersions as powder or preferably as an aqueous preparation, for example as an aqueous pulp of 1 to 5% by weight, for example, in the form of a slurry or a paste.

Depending on the nature of the layered silicate(s) used and depending on the intended use of the aqueous powder coat dispersion thus formulated, it can be of advantage to comminute the layered silicates, either as powder or as a component of a previously prepared aqueous preparation of layered silicate. A negative influence on the properties, in particular on the optical properties of coating layers applied from the aqueous powder coat dispersions according to the invention can thereby be avoided.

From the point of view of processing it is preferred that the aqueous phase of the aqueous powder coat dispersions according to the invention, in addition to the layered silicate content, contains 0.05 to 0.5% by weight of a poly(meth) acrylic acid thickener, based on the weight of the powder coat in the aqueous powder coat dispersion according to the invention. Then the aqueous powder coat dispersions according to the invention are characterized by less abrupt transitions in their rheological behaviour when changing between their rest state and the state in which they are influenced by shearing forces, for example, when manipulating aqueous powder coat dispersions according to the invention during filling or transfer processes. Poly(meth) acrylic acid thickeners are thickeners known to the person skilled in the art for aqueous coating systems, for example, copolymers of (meth)acrylic acid and (meth)acrylic acid esters containing polymerised (meth)acrylic acid, for example, in an amount of 30 to 60% by weight. The product Viscalex® HV 30 from the company Allied Colloids is a preferred example of the commercially available poly(meth) acrylic acid thickeners.

As a rule, poly(meth)acrylic acid thickeners are used in an at least partially neutralized form in aqueous coating systems or, after their addition to an aqueous coating system, are at least partially neutralized. Amines or aminoalcohols are particular examples of alkaline neutralizing agents which can be used for partially or totally neutralizing poly(meth) acrylic acid thickeners. Poly(meth)acrylic acid thickeners in partially or totally neutralized form can also be used in the aqueous powder coating dispersions according to the invention. Surprisingly, the poly(meth)acrylic acid thickeners can also be added to the aqueous powder coat dispersions according to the embodiment containing layered silicate in a non-neutralized form, for example, as an aqueous 5 to 30% by weight solution. The rheological effectiveness of the poly(meth)acrylic acid thickeners is thereby surprisingly obtained, despite the fact that no use is made of neutralising agents, while possible negative influences of alkaline neutralising agents can be safely avoided.

The addition of poly(meth)acrylic acid thickeners to the aqueous powder coat dispersions according to the invention containing layered silicate in a non-neutralized form is particularly advantageous when the aqueous powder coating dispersions contain components which require the absence of alkaline neutralising agents. The presence of alkaline neutralising agents in aqueous powder coat dispersions which contain, for example, acidic components, can result in incompatibility phenomena such as for example the formation of specks in the wet coat and/or in the finished coating layers applied therefrom and subsequently stoved. Examples of aqueous powder coat dispersions according to the invention containing acidic components are those which contain powder coatings with acidic curing agents, for example, powder coatings based on epoxy-acid/ acid anhydride crosslinking chemistry.

The aqueous phase of the aqueous powder coat dispersions according to the invention, apart from water and the content of the silica compound(s), may contain additional additives in amounts of, for example, 0.1 to 5% by weight, based on the powder coating content in the aqueous powder coat dispersion. Examples of such additives are surfaceactive agents, dispersing agents, biocides, defoamers, leveling agents, light protecting agents, neutralizing agents and various Theologically effective components, for example, non-ionic polymeric thickeners, for example based on polyurethanes, polyacrylates or cellulose ethers, in particular non-ionic polyurethane associative thickener. It is preferred that no organic solvents are contained in the aqueous phase or that they are contained therein in amounts below 1% by weight, for example, based on the powder coating content in the aqueous powder coat dispersion.

The invention also relates to a process for preparing the aqueous powder coat dispersions of the present invention. The aqueous powder coat dispersions according to the invention can be prepared using various known process principles, known to the person skilled in the art, for example, from the patent literature relating to the preparation of aqueous powder coat dispersions. The content of the silica compound can be added at different places, also, for example, to actually finished aqueous powder coat dispersions. For the preparation of the aqueous powder coat dispersions according to the invention the silica compound in each case can be inserted or added as a powder or as an aqueous preparation, for example as an aqueous slurry, paste or pulp of 1 to 5% by weight. As mentioned, layered silicates can thus be used in comminuted form.

The aqueous powder coat dispersions according to the invention can, for example, be prepared by dispersing a melt or an organic solution of a powder coating in water or in an aqueous composition which can contain additives and/or the silica compound. The principle for the preparation of aqueous powder coat dispersions by dispersing a powder coat melt or solution in an aqueous phase is, for example, described in WO 98/27141, EP-A-0 805 171 and EP-A-0 899 282. It is preferred to use apparatus which guarantee a strong dispersing effect, such as, for example, high pressure homogenizers, rotor-stator-units, and, in particular, spray dispergators. When using, for example, a jet dispergator, a melt or an organic solution of the powder coating under an overpressure of, for example, up to 50 bar is atomized in water or in an aqueous composition, which can contain the silica compound and/or other additives. During atomizing, the melt or the solution is relaxed and finely distributed. After cooling, the dispersed melt or after the removal of solvents from the dispersed organic solution, for example by distillation, optionally under reduced pressure, the silica compound, which is possibly still missing, and/or additives that are possibly missing can be added to the aqueous phase and be well mixed in. In this way an aqueous powder coat dispersion according to the invention is obtained.

The aqueous powder coat dispersions according to the invention can also be prepared by providing a finely divided powder coating which can for example be obtained by dry milling, and subsequently homogenizing the powder coating particles in an aqueous phase. The principle for preparing aqueous powder coat dispersions by dry milling of a powder coating and subsequent homogenizing of the finely milled powder coating particles in an aqueous phase is described, for example, in EP-A-0 652 264. This is, for example, carried out by first preparing a powder coating, preferably by extruding the completely formulated powder coating obtained by dry mixing all required components, in the form of a paste-like melt, cooling the melt, coarse comminuting, milling or fine milling, for example, to an average particle size ($d_{50}$) of 0.1 to 10 µm, preferably below 5 µm. Units which are preferred for the fine milling are for example jet pulverizers. The finely milled powder coating particles are then introduced into water or into an aqueous composition which can contain the silica compound and/or additives, and are homogeneously distributed, for example by stirring. The silica compound, which is possibly still missing, and/or additives which are possibly missing can then be added and well mixed in. The sequence of addition of finely divided, for example finely milled powder coating, additives and the silica compound to water can in principle be freely chosen.; It is preferred to add finely divided powder coating to a previously prepared aqueous composition which already contains the silica compound and other desired additives, such as, for example, the poly(meth)acrylic thickener additive in combination with the layered silicates.

The preferred preparation process for the aqueous powder coat dispersions according to the invention is the preparation by means of wet milling a powder coating in an aqueous phase. The principle for the preparation of aqueous powder coat dispersions by means of wet milling of a powder coating in an aqueous phase is, for example, described in WO 96/32452 and WO 96/37561. This is, for example, carried out by first preparing a powder coating, preferably by extruding the completely formulated powder coating obtained by dry mixing all required components in the form of a paste-like melt, cooling the melt, coarse comminuting and milling, for example, to an average.particle size ($d_{50}$) of 10 to 30 µm. The powder coating particles are then introduced into water or into an aqueous composition, which can contain the silica compound and/or additives, and wet milled therein for example to an average particle size ($d_{50}$) of 0.1 to 10 µm, preferably below 5 µm. Milling apparatus conventionally used in the coating industry, such as for example bead mills, sand mills and agitating ball mills are suitable as units for carrying out wet milling. The silica compound, which is possibly still missing, and/or additives which are possibly missing can be added subsequently and well mixed in.

The sequence of addition of powder coating, additives and silica compound can, in principle, be freely chosen. It is preferred to add the powder coating to a previously prepared aqueous composition which already contains the silica compound and other desired additives, and to wet mill it therein. During wet milling, care must be taken that the temperature in the mixture to be milled does not increase too much, for example, that it remains below the glass transition temperature of the powder coating. For example, a ground stock temperature of 10 to 25° C. can be maintained by cooling.

The aqueous powder coat dispersions according to the invention can also be prepared by adding the silica compound to a fully prepared aqueous powder coat dispersion. This can, for example, be carried out subsequently in the form of an addition of the silica compound as a correcting additive to an aqueous powder coat dispersion.

The invention also relates to the use of the aqueous powder coat dispersions according to the invention for the preparation of coatings on different substrates, in particular metallic substrates such as, for example, automotive bodies or parts thereof. The aqueous powder coat dispersions can be used for the preparation of single layer coatings or for the preparation of coating layers which are part of a multi-layer coating.

The aqueous powder coat dispersions according to the invention can be applied on uncoated or pre-coated substrates by known processes, in particular by spraying, leading to a dry layer thickness of 25 to 80 µm, for example. The dry layer thickness is governed by the use, respectively the type and function of the coating layer which is being prepared. The aqueous powder coat dispersions according to the invention can be applied in one or more spraying operations. An application in several spraying operations may, for example, be necessary for the preparation of coating layers with a high dry layer thickness which cannot be obtained in one single spraying step. In this case the aqueous powder coat dispersions according to the invention exhibit an advantageous behavior from an application technology point of view, since they require only short periods of time for the intermediary flash-off process or drying process which is necessary between the individual spraying operations. The aqueous powder coat dispersions according to the invention dry after their application, for example, during a flash-off phase, to become coating layers which are comparable to those which are obtained by means of an application of coating layers of powder coating agents. Once the coating layers have dried, they are heated and made to melt and flow and, in the case of coating layers generated by aqueous powder coat dispersions containing duroplastic powder coating, they are chemically cured. Depending on the type of the binder system of the powder coating, the chemical curing can be thermally and/or photochemically induced by high-energy radiation, for example UV-radiation. Thermal curing at temperatures of, for example, 100 to 180° C. may be carried out for example by convection and/or IR- and/or NIR-irradiation.

The aqueous powder coat dispersions according to the invention are suitable for the preparation of coatings, in particular multi-layer coatings in the field of coating of automotive bodies or parts thereof. Pigmented aqueous powder coat dispersions according to the invention can, for example, be used as aqueous powder filler coating agents or as aqueous powder stone chip preventing coatings for the preparation of a filler layer or a protective layer against stone chip impacts. Apart from their use for the preparation of the above-mentioned intermediary layers, pigmented aqueous powder coat dispersions according to the invention can also be used for the preparation of base coat layers or top coat layers.

The earlier mentioned aqueous powder clear coat dispersions, described in more detail as preferred embodiments of the aqueous powder coat dispersions according to the invention, are suited, for example, for the preparation of transparent top coat layers, in particular for the preparation of the outer clear coat layer of a multi-layer coating. The aqueous powder clear coat dispersions according to the invention are preferably used for the preparation of a base coat/clear coat two-layer coating. The color and/or effect-giving base coat layer is applied on an optionally pre-coated substrate, in particular on pre-coated automotive bodies or parts thereof, before the clear coat coating layer consisting of an aqueous powder clear coat dispersion according to the invention is applied and stoved.

Examples of pre-coating layers on automotive bodies or parts thereof are electro-immersion primer layers, a two-layered pre-coat consisting of an electro-immersion primer layer and a spray filler layer, a two-layered pre-coating consisting of an electro-immersion primer layer and a functional layer, for example in the form of a first base coat layer having filler properties or a two-layered pre-coating consisting of an electro-immersion primer layer and a second electrophoretically applied coating layer. While the color- and/or effect-giving base coat layer, prior to the application of the clear coat layer from an aqueous powder clear coat dispersion according to the invention may be stoved, it is preferred, however, to apply the aqueous powder clear coat dispersion according to the invention according to the known wet on wet process on top of the base coat layer which determines the color shade of the multi-layer coating. The base coat layer is thereby applied by spraying of a color- and/or effect-giving aqueous or solvent-based base coat in a coating layer thickness which depends on the color shade, for example between 10 to 25 $\mu$m. Following the application of the base coat layer, after a short flash-off phase, for example at 20 to 80° C., the application of the clear coat layer from the powder clear coat dispersion according to the invention is carried out, for example, by spraying, for example, in a dry coating layer thickness of generally between 25 and 60 $\mu$m. After a flash-off phase, for example at temperatures of 20 to 50° C., the substrate is presented to the flow and stoving process where the clear coat layer together with the base coat layer is stoved at elevated temperatures of, for example, 100 to 160° C.

The aqueous powder coat dispersions according to the invention are characterized by a good sedimentation stability and they have a high sagging limit when applied to vertical surfaces and during the subsequent melting and flowing steps and, if applicable, stoving step. They possess an advantageous technical application behavior when applied in several spraying operations.

EXAMPLES

Example 1
Preparation of Powder Clear Coating 729 g of an epoxy-functional methacryl copolymer with an epoxy-weight equivalent of 380 and an average molecular weight (Mn) of 2000, 210 g 1.12-dodecandiacid, 30 g of a light protecting agent (1:1-mixture of Tinuvin® 900 (UV-absorber) and Tinuvin® 111 (sterically hindered amine light protecting agent), both from the company Ciba), 3 g benzoin, 6 g of Irganox® B 225 (antioxidant) from the company Ciba and 8 g of Troy® EX 570 (leveling agent) from the company Troy Chemie are first mixed in a dry state and then dispersed at 100 to 120° C. by means of an extruder. After cooling off and pre-comminuting of the extrudate the latter is milled in an air separation ball mill to an average particle size ($d_{50}$) of 20 $\mu$m to a powder clear coat.

Preparation of Aqueous Powder Clear Coat Dispersion 10 g of Borchigen® PP 100 (surface-active agent) from the company Borchers, 5 g of Defoam®400 (defoamer) from the company Add APT and 2 g Aerosil® 200 (pyrogenic silicic acid not rendered hydrophobic with a BET-surface of 205 m$^2$/g) from the company Degussa are added while stirring to 633 g of deionized water and homogeneously mixed. Subsequently, 350 g of the powder clear coat obtained above are then well mixed in and by means of an agitating ball mill are milled until an average particle size ($d_{50}$) of 4,8 $\mu$m is reached. During wet milling the temperature of the ground stock is kept below 20° C.

Example 2 (Comparative Example)

Example 1 was repeated except that, instead of the 2 g Aerosil® 200, 5 g of Borchigel® LW 44 (non-ionic polyurethane-associative thickener) from the company Borchers were used.

Rheological Measurements

The aqueous powder clear coat dispersions obtained in Example 1 and Example 2 were rheologically measured in a rotating viscosimeter at a measuring temperature of 10° C. The shearing rate was continuously increased over five minutes from 0 to 150 s$^{-1}$, shearing took place for one minute at a constant rate of 150 s$^{-1}$ and subsequently the shearing rate was continuously reduced over five minutes from 150 to 0 s$^{-1}$.

Both branches of the viscosity curve (up and down curve) of the aqueous powder clear coat dispersion obtained in Example 1 show a pronounced thixotropy.

The viscosity curve obtained with the aqueous powder clear coat dispersion of Example 2 shows structural viscosity with only a low thixotropy. The viscosity curve of the aqueous powder clear coat dispersion of Example 2, in comparison to the viscosity curve of the aqueous powder clear coat dispersion of Example 1, is clearly less strongly curved.

Examination of the Sedimentation Behavior 50 ml each of the aqueous powder clear coat dispersions obtained in Example 1 and Example 2 were each filled in a 50 ml glass jar (inner diameter of 2 cm) and stored at 8° C. in a refrigerator. After 7 days, in the case of the aqueous powder clear coat dispersion of Example 1, no supernatant had formed, while a clear supernatant of 5,5 cm$^3$ had formed in the case of the powder clear coat dispersion of Example 2.

Examination of the Application Technology Behavior

50 $\mu$m-thick clear coat layers from the aqueous powder clear coat dispersions of Examples 1 and 2 were each sprayed onto test panels which had been pre-coated with a cataphoresis coating and placed in a vertical position, and after a ten-minute flash-off at 45° C. were stoved for 30 minutes at 150° C. (object temperature). In order to obtain a dry coating layer of 50 $\mu$m the spray application was carried out each time in three spraying operations, whereby a flash-off step had to be carried out between the individual spraying operations in order to prevent the appearance of sagging phenomena during the application. In the case of the aqueous powder clear coat dispersion of Example 1, each time a two-minute flash-off phase was sufficient, while the case of the aqueous powder clear coat dispersion of Example 2, it was each time necessary to keep to a five-minute flash-off phase.

Determination of Sagging Limits

From the aqueous powder clear coat dispersions of Examples 1 and 2 wedge-shaped clear coat layers in a dry layer thickness range of 25 to 75 $\mu$m were sprayed each onto test panels which had been pre-coated with a cataphoresis coating and placed in a vertical position, and after a ten-minute flash-off at 45° C. were stoved for 30 minutes at 150° C. (object temperature). In the case of the aqueous powder clear coat dispersion of Example 1, the optically perceptible sagging limit was situated at 50 $\mu$m, while in the case of the aqueous powder clear coat dispersion of Example 2 the sagging limit was situated at 37 $\mu$m.

Example 3
Preparation of Powder Clear Coating 729 g of an epoxy-functional methacryl copolymer with an epoxy-weight equivalent of 380 and an average molecular weight (Mn) of 2000, 210 g 1.12-dodecandiacid, 30 g of a light protecting agent (1:1-mixture of Tinuvin® 900 (UV-absorber) and Tinuvin® 111 (sterically hindered amine light protecting agent), both from the company Ciba), 3 g benzoin, 6 g of Irganox® B 225 (antioxidant) from the company Ciba and 8 g of Troy® EX 570 (leveling agent) from the company Troy Chemie are first mixed in a dry state and then dispersed at 100 to 120° C. by means of an extruder. After cooling off and pre-comminuting of the extrudate the latter is milled in an air separation ball mill to an average particle size ($d_{50}$) of 20 µm to a powder clear coat.

Preparation of an Aqueous Powder Clear Coat Dispersion 10 g of Borchigen® PP 100 (surface-active agent) from the company Borchers, 5 g of Defoam® 400 (defoamer) from the company Add APT and 43 g of a 3 % by weight aqueous pulp of layered silicate (manufactured by mixing 3 g of Optigel® SH from the company Suidchemie with 97 g of de-ionized water) are added while stirring to 592 g of de-ionized water and homogeneously mixed. 350 g of the powder clear coat obtained above are subsequently well stirred in and are milled using an agitating ball mill until a mean particle size ($d_{50}$) of 4.8 µm is reached. During the wet milling operation the temperature of the ground material is kept below 20° C.

Example 4

Example 3 is repeated except that in the preparation of the dispersion, 4 g of a 10% by weight non-neutralized aqueous solution of Viscalex® HV 30 from the company Allied Colloids was added and, instead of the 592 g of de-ionized water, 588 g of de-ionized water is used.

Example 5 (Comparative Example)

Example 3 is repeated except that 5 g of Borchigel® LW 44 (non-ionic polyurethane-associative thickener) from the company Borchers is used in lieu of the layered silicate pulp and, instead of the 592 g of de-ionized water, 630 g of de-ionized water is used.

Example 6 (Comparative Example)

Example 3 is repeated except that the layered silicate was eliminated, 4 g of a 10% by weight non-neutralized aqueous solution of Viscalex® HV 30 is used and, instead of the 592 g of de-ionized water, 631 g of de-ionized water is used.

Example 7 (Comparative Example)

Example 3 is repeated except that the layered silicate is eliminated, 10 g of a 10% by weight non-neutralized aqueous solution of Viscalex® HV 30 is used and, instead of the 592 g of de-ionized water, 625 g of de-ionized water is used.

Example 8 (Comparative Example)

Example 6 is repeated except that instead of the non-neutralized Viscalex® HV 30, 8 g of a 10% by weight aqueous solution of Viscalex® HV 30, fully neutralized with dimethylethanolamine, is used and that, instead of the 592 g of deionized water, 627 g of de-ionized water is used.

The aqueous powder clear coat dispersions of Examples 6 and 7 exhibit viscosity characteristics which are not suitable for an application; they sediment immediately after their preparation.

While the aqueous powder clear coat dispersion of Example 8 exhibits viscosity characteristics which are suitable for an application, the stoved coating layer, however, comprises a large number of optically disturbing specks.

Rheological Measurements

The aqueous powder clear coat dispersions obtained in Examples 3, 4 and 5 were theologically measured in a rotating viscosimeter at a measuring temperature of 10° C. The shearing rate was continuously increased over five minutes from 0 to 150 $s^{-1}$, shearing took. place for one minute at a constant rate of 150 $s^{-1}$ and subsequently the shearing rate was continuously reduced over five minutes from 150 to $0s^{-1}$.

Both branches of the viscosity curve (up and down curve) of the aqueous powder clear coat dispersion obtained in Examples 3 and 4 show a pronounced thixotropy. The viscosity curve of the aqueous powder clear coat dispersion obtained in Example 4 has a slightly elevated level as compared with the curve of Example 3.

The viscosity curve obtained with the aqueous powder clear coat dispersion of Example 5 shows structural viscosity with only a low thixotropy. The viscosity curve of the aqueous powder clear coat dispersion of Example 5, in comparison to the viscosity curves of the aqueous powder clear coat dispersions of Examples 3 and 4, is clearly less strongly curved.

Examination of the Sedimentation Behavior 50 ml each of the aqueous powder clear coat dispersions obtained in Examples 3, 4 and 5 were each filled in a 50 ml glass jar (inner diameter of 2 cm) and stored at 8° C. in a refrigerator. After 7 days, in the case of the aqueous powder clear coat dispersion of Examples 3 and 4, no supernatant had formed, while a clear supernatant of 5,5 $cm^3$ had formed in the case of the powder clear coat dispersion of Example 5.

Examination of the Application Technology Behavior

50 µm-thick clear.coat layers from the aqueous powder clear coat dispersions of Examples 3, 4 and 5 were each sprayed onto test panels which had been pre-coated with a cataphoresis coating and placed in a vertical position, and after a ten-minute flash-off at 45° C. were stoved for 30 minutes at 150° C. (object temperature). In order to obtain a dry coating layer of 50 µm the spray application was carried out each time in three sprayingoperations, whereby a flash-off step had to be carried out between the individual spraying operations in order to prevent the appearance of sagging phenomena during the application. In the case of the aqueous powder clear coat dispersions of Examples 3 and 4, each time a two-minute flash-off phase was sufficient, while in the case of the aqueous powder clear coat dispersion of Example 5, it was each time necessary to keep to a five-minute flash-off phase.

Determination of Sagging Limits

From the aqueous powder clear coat dispersions of Examples 3, 4 and 5, wedge-shaped clear coat layers in a dry layer thickness range of 25 to 75 µm were sprayed each onto test panels which had been pre-coated with a cataphoresis coating and placed in a vertical position, and after a ten-minute flash-off at 45° C. were stoved for 30 minutes at 150° C. (object temperature). In the case of the aqueous powder clear coat dispersion of Examples 3 and 4, the optically perceptible sagging limits were situated at 60 and 70 µm, while in the case of the aqueous powder clear coat dispersion of Example 5 the sagging limit was situated at 37 µm.

What is claimed is:

1. An aqueous powder clear coat dispersion comprising a powder clear coating dispersed in an aqueous phase, wherein the powder clear coat dispersion has a solid content of 20 to 60% by weight of particles having an average particle diameter ($d_{50}$) of 0.1 to 10 μm, a binder selected from the group consisting of polyester resins, (meth)acrylic copolymers and polyurethane resins, and wherein the aqueous phase contains a silica compound selected from the group consisting of:

(a) 0.2 to 2% by weight, based on the weight of the powder clear coating, of finely divided hydrophilic silicic acid with large BET-surface;

(b) 0.1 to 1.5% by weight, based n the weight of the powder clear coating, of layered silicates; and (c) combinations thereof.

2. The aqueous powder clear coat dispersion of claim 1, wherein the BET-surface of the finely divided hydrophilic silicic acid is 100 to 400 m²/g.

3. The aqueous powder clear coat dispersion of claim 1, wherein the finely divided hydrophilic silicic acid is pyrogenic silicic acid.

4. The aqueous powder clear coat dispersion according to claim 1, wherein the powder clear coating is selected from the group consisting of powder coatings based on a thermoplastic binder, powder coatings based on self crosslinking binders and powder coatings based on external cross-linking binder/cross-linking agent combinations.

5. The aqueous powder clear coat dispersion according to claim 1, wherein the powder clear coat is a powder clear coat based on a binder/cross-linker combination selected from the group consisting of:

(a) hydroxy-functional binders with blocked polyisocyanates and (b) epoxy-functional binders with
   (i) carboxylic acid functional curing agents;
   (ii) carboxylic acid anhydride functional curing agents;
   (iii) tris(alkoxycarbonylamino)triazine curing agents; and (iv) combinations of (i)–(iii).

6. The aqueous powder clear coat dispersion according to claim 1, wherein the aqueous phase contains 0.1 to 1.5% by weight, based on the weight of the powder clear coat, of layered silicates and 0.05 to 0.5% by weight, based on the weight of the powder clear coat, of a poly(meth)acrylic acid thickener, wherein the poly(meth)acrylic acid thickener can be non-neutralized, partially neutralized or totally neutralized.

7. A process for the preparation of an aqueous powder clear coat dispersion comprising the steps of:

(a) incorporating a powder clear coating into an aqueous composition; and (b) incorporating a silica compound into said aqueous composition, wherein said silica compound is selected from the group consisting of:
   (i) finely divided hydrophilic silicic acid with large BET-surface;
   (ii) layered silicates; and
   (iii) combinations thereof.

8. The process according to claim 7, wherein the step (a) is selected from the group consisting of:

(a) dispersing the powder clear coating into the aqueous composition;

(b) homogeneously distributing the powder clear coating into the aqueous composition; and (c) wet milling the powder clear coating in the presence of the aqueous composition.

9. A process of coating a substrate, comprising the step of applying the aqueous powder clear coat dispersion according to claim 1.

10. The process according to claim 9, wherein the substrate is selected from the group consisting of an automotive body and parts thereof.

* * * * *

UNITED STATES PATENT AND TRADEMARK OFFICE
CERTIFICATE OF CORRECTION

PATENT NO. : 6,441,078 B1
DATED : August 27, 2002
INVENTOR(S) : Doessel et al.

It is certified that error appears in the above-identified patent and that said Letters Patent is hereby corrected as shown below:

Column 5,
Line 8, "Optige" must be replaced with -- Optigel --.

Column 6,
Line 23, "Theologically" must be replaced by -- rheologically --.

Column 10,
Line 52, "while the" must be replaced by -- while in the --

Column 12,
Line 7, "theologically" must be replaced by -- rheologically --.

Column 13,
Line 11, "based n'" must be replaced by -- based on --.

Signed and Sealed this

First Day of April, 2003

JAMES E. ROGAN
*Director of the United States Patent and Trademark Office*